United States Patent Office 2,983,284
Patented May 9, 1961

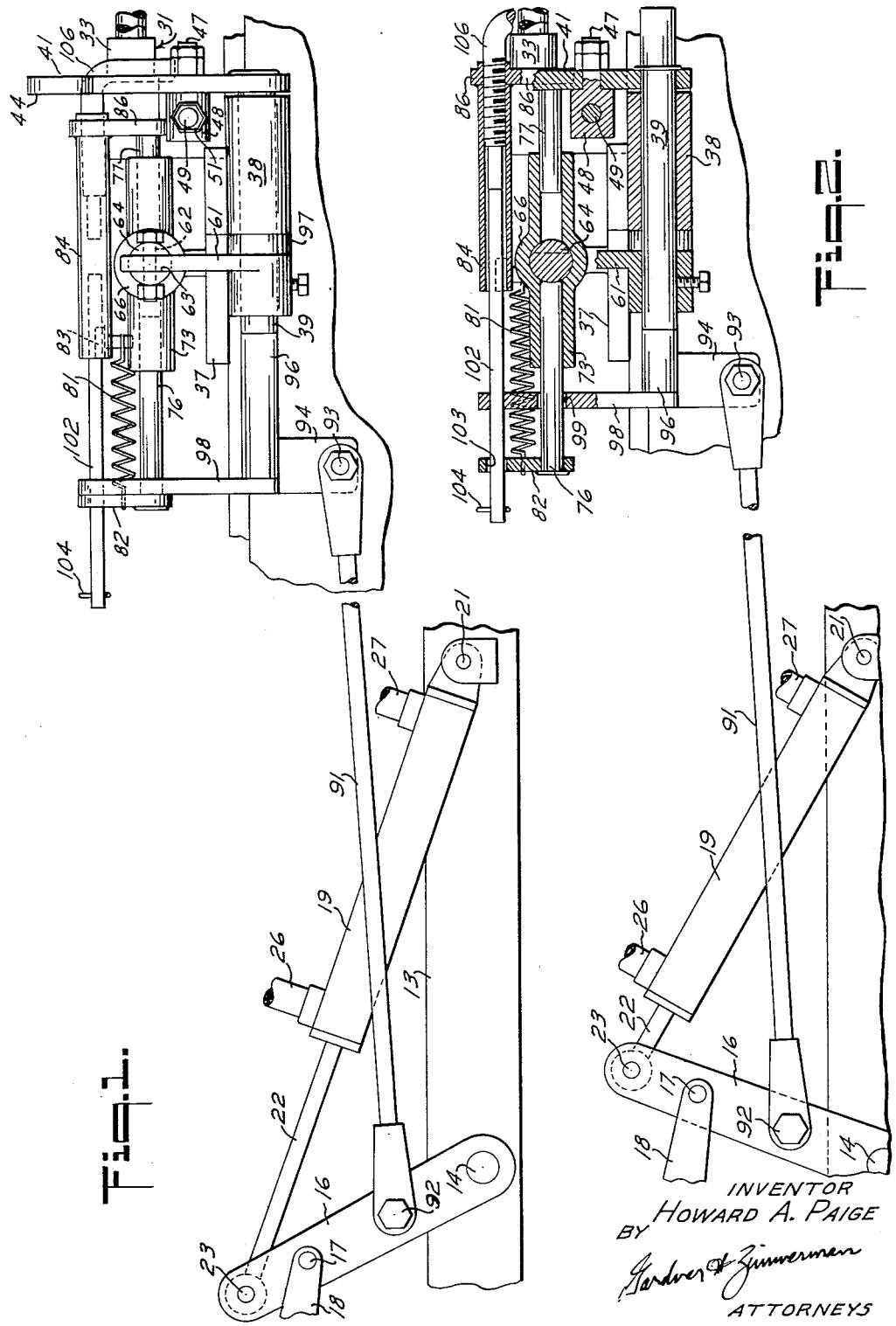

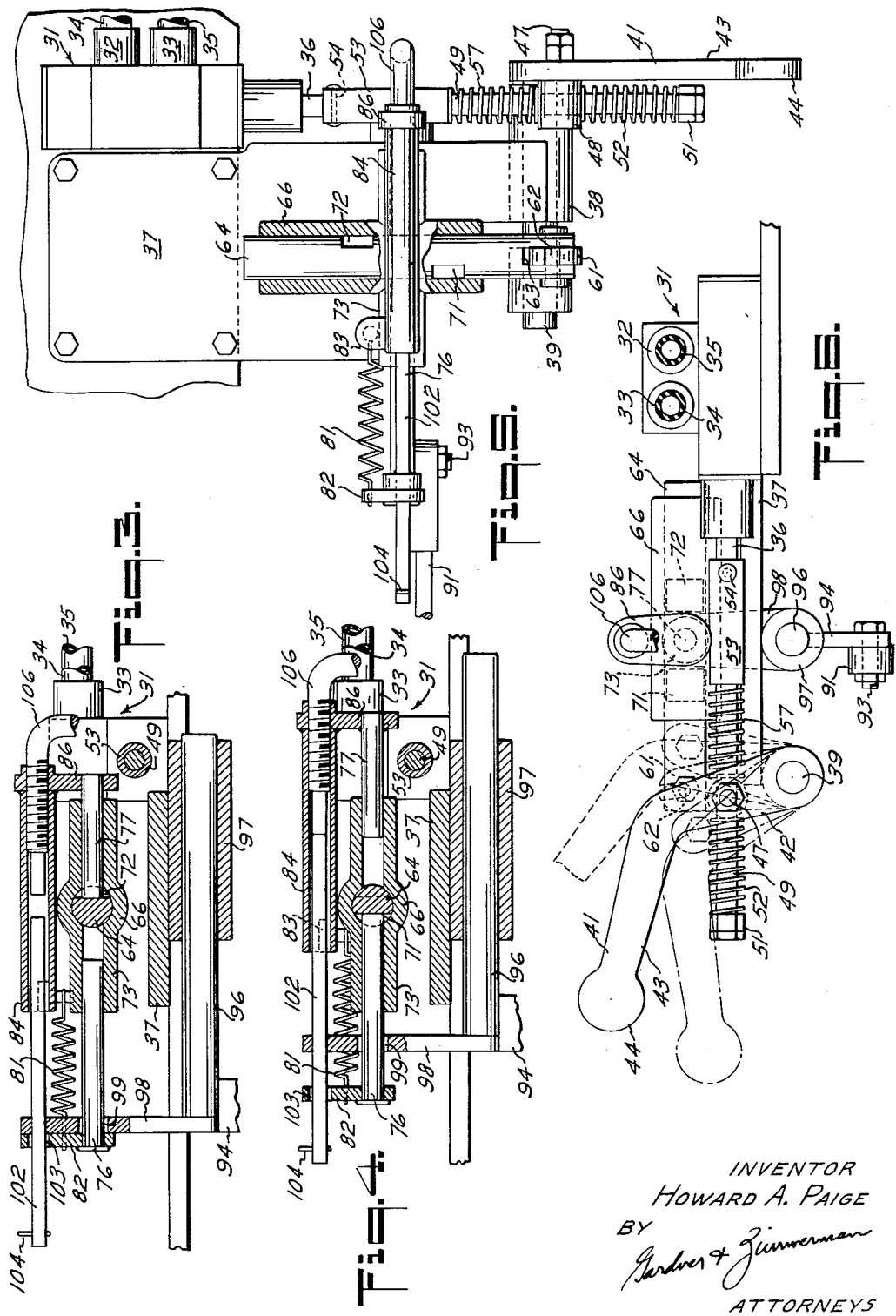

2,983,284

HYDRAULIC DEPTH CONTROL MECHANISM FOR TRACTOR TOOL BARS AND THE LIKE

Howard A. Paige, 327 Roache Road, Watsonville, Calif.

Filed May 2, 1958, Ser. No. 732,501

8 Claims. (Cl. 137—622.5)

This invention generally relates to control mechanisms of the fluid actuated type, and is more particularly directed towards such a mechanism which is adapted to work in cooperation with apparatus for raising and lowering a tractor tool bar on which the ground working tools are mounted.

In connection with cultivating or similar operations on the soil, it is customary to drive a tractor along predetermined paths over the ground and cause one or more ground working tools to enter the ground to a predetermined depth. In accordance with conventional practice, power actuated apparatus is usually provided for effecting movement of the tool bar so as to place the same selectively into an operative lower position or an inoperative raised position.

Accordingly, it is an object of the present invention to provide a control mechanism for moving an object, such as a tractor tool bar in opposite directions, and maintain the same in selected positions of movement.

Another object of this invention is to provide apparatus of the character described which is operable by initially directing fluid under pressure to selectively raise or lower an object and which automatically restrains further fluid flow when the object reaches a preselected determined raised and lowered position.

Another object of the invention is to provide a control mechanism of the type described which actuates a fluid control valve in such a manner that the latter will be automatically placed in a neutral position when a cylinder actuated by the valve has been moved a predetermined amount.

Yet another object of the invention is to provide apparatus as hereinabove described in which means are incorporated for simply and readily adjusting the amount of travel of the article being moved.

Still another object of the invention is to provide apparatus as hereinabove described in which a single actuation of a hand lever commences an automatic cycle of operation and results in a movement and subsequent stopping of an article in its proper position.

A further object of the invention is to provide a control mechanism which while automatic in operation permits further manually controlled movement even when the parts are in their normal neutral position.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a front elevational view of the control mechanism in its neutral position, shown in association with a portion of a tool holder apparatus, the latter being shown in its raised position.

Figure 2 is a view similar to Figure 1, with parts being broken away to indicate features of construction, the control mechanism again being in neutral position and the tool holder in a lowered position.

Figure 3 is a transverse cross-sectional elevational view of a portion of the control mechanism and indicates the position of the parts after an operator has moved the unit to lower the tool holder.

Figure 4 is a view similar to Figure 3 but indicating the position of the parts when the apparatus has been actuated to raise the tool holder.

Figure 5 is a plan view of the apparatus.

Figure 6 is a side elevational view of the apparatus shown in Figure 5, with the handle being shown in its three positions of movement.

As hereinabove explained, the control mechanism of the present invention is adapted for operative connection to apparatus for raising and lowering an object such as a tractor tool bar. As best seen in Figures 1 and 2 of the drawing, a portion of a tractor 13 is illustrated to which a link 16 is pivotally connected such as by a shaft 14. Link 16, adjacent an upper portion thereof, is provided with a pivot pin 17 to which is connected an additional link 18 which is operatively connected to the tractor bar (not shown). In this manner, by rotating the link 16 from the position illustrated in Figure 1, to the position shown in Figure 2, the links 16 and 18 together with other bar supporting mechanism (not shown) will cause the tractor bar tool holder to be moved from its raised to its lowered position. The actuation of link 16 is effected through a hydraulic cylinder 19, one end of which is pivotally connected to the tractor as indicated at 21, and the free end of which has an axially extending piston rod 22 which is pivoted at 23 to the upper end of link 16. The cylinder adjacent its ends is provided with a pair of combination inlet and outlet ports 26 and 27 respectively so that fluid under pressure may be selectively caused to enter the port 26 effecting a retraction of the piston rod and clockwise rotation of link 16, thereby resulting in a lowering of the tool holder. Conversely, by directing fluid into port 27, the piston rod 22 is extended and the link 16 will move to the position indicated in Figure 1 and effect a raising of the tool holder.

Conventionally, a manually controlled valve is utilized so as to selectively cause fluid under pressure to enter one or the other of the ports 26 and 27, but it will be readily appreciated that such a manual control requires particular skill and attention on the part of the operator to insure a raising and lowering of the bar to a desired elevation. This is not practical since most cultivation requires a particular depth of penetration of the tool and it is frequently difficult for the operator to judge by eye the time when the link 16 has been sufficiently moved to effect a proper soil penetration.

In accordance with the teachings of the present invention, means are provided for automatically stopping further movement of the piston rod 22 when the link 16 has reached its desired limits of pivotal movement, which will of course, result in the tool bar or tool holder likewise being at a desired lowered and raised position.

As here illustrated, fluid under pressure is selectively directed towards one of the cylinder ports 26 and 27 through a control valve, generally indicated at 31 which may be operatively connected to a fluid pump. This valve is provided with a pair of ports 32 and 33, such ports being respectively attached to the cylinder ports 26 and 27 through flexible conduits 34 and 35 respectively. Valve 31 in accordance with conventional design is provided with a piston rod 36 extending outwardly therefrom and which, upon axial movement, will selectively cause fluid to flow through the ports 32 or 33 so as to effect an extention or retraction of the piston rod 22 for the reasons previously explained. Valve 31 is operatively positioned on a portion of the tractor or other supporting surface in adjacent relationship to a horizontally disposed base member 37, the latter being likewise secured by bolts or the like to the tractor.

Depending from a rear end portion of base 37 is a sleeve 38 disposed in generally horizontal position with its axis at right angles to the valve actuating rod 36. A shaft 39 is journaled for rotation in said sleeve and adjacent one end of the shaft is secured a handle 41, the latter, as best seen in Figure 6 of the drawing, having a pair of angularly related arms 42 and 43, the end of the latter being provided with a knob 44 or the like intended for manual engagement by the operator. Handle portion 42 is apertured to receive a pin 47 to which a stub shaft 48 is mounted. An aperture is provided in the shaft 48 in axial alignment with the valve rod 36 for slidably receiving a pin 49 which extends on opposite sides of the shaft. One end of the pin is provided with an enlarged stop member such as a bolt 51 and interposed between such stop member and shaft 48 is a compression spring 52. The other end of pin 49 is secured to a sleeve member 53 which in turn is secured such as by a rivet 54 to the valve rod 36. A spring 57 similar to spring 52 is placed around the pin 49 between the shaft 48 and an end of the sleeve member 53. It will thus be seen that the handle may be rotated with its pivot shaft 39 against the pressure of the spring 52 or 57. From the foregoing description, it will be seen that the handle may be moved from its normal position, indicated in solid lines in Figure 6 of the drawing, downwardly to the dot-dash position against the compression of spring 52, causing a retraction of the valve actuating rod 36 and causing fluid to flow from the valve member into cylinder port 26 and resulting in a clockwise movement of link 16 and a corresponding lowering of the tool bar. Conversely, the rod 36 may be caused to enter further into the valve 31 by rotating of the handle into the raised dotted line position illustrated in Figure 6 against the compression of spring 57, which will result in fluid being directed into cylinder port 27, and a subsequent extension of rod 22 and a counterclockwise rotation of link 16 causing a raising of the tractor tool bar holder.

The foregoing mechanism would be sufficient if an operator were capable of judging the descension and elevation of the tool holder with sufficient accuracy to properly control the depth to which the tools would enter the soil. However, as previously explained, this is not a practical approach since the operator has other functions to perform even if he were qualified to judge this depth control with sufficient accuracy. Accordingly, as an important feature of the invention, means are provided so that in either raising or lowering the tool holder, fluid from valve 31 will be directed into the control cylinder 19 for only a predetermined period thereby limiting the degree of descent or elevation of the tool holder.

The foregoing is preferably accomplished by initially locking the handle 41 upon actuation thereof in its raised dotted line position shown in Figure 6 and/or its lowered dot-dash representation illustrated in the same figure until the link 16 has been moved to a predetermined position, at which time the handle 41 is caused to return to its neutral position (indicated in solid lines) so that equal pressure will be maintained in both of the valve ports 32 and 33, thereby restraining the piston in control cylinder 19 against further movement. Such locking will naturally result in a similar locking of link 16 and through its connection to the tool holder, to the latter as well. As here illustrated, the foregoing operation is accomplished in the following manner. The handle shaft 39 which is rigidly connected to the handle for rotation in the sleeve 38 is provided with a radially extending arm 61 extending generally upwardly from the shaft. Arm 61 adjacent its upper end is preferably bifurcated to slidably engage a transverse pin 62 which extends across an open slot 63 formed in a shaft 64 disposed in parallel relationship to the valve actuating rod 36. Rod 64 is mounted for axial reciprocating movement in a journal member 66 which may be suitably attached to the base 37. From the foregoing, it will be appreciated that as the handle 41 is moved into its selective positions, such movement will impart longitudinal reciprocation to the rod 64, the direction of rod travel being dependent on the direction of movement of the handle. For a purpose presently to be explained, the rod 64 is provided with a pair of generally rectangular notches or grooves indicated at 71 and 72 respectively. It will be seen that these grooves are oppositely directed and are axially spaced from each other along the length of the rod. In communication with the bore of journal 66 and extending normally from a medial portion thereof is a cross journal 73, and mounted for axial sliding movement in the respective arms of the cross journal are lock pins or detents indicated at 76 and 77 respectively. Means are provided normally urging the adjacent opposed ends of the detents towards the rod 64 so that when and as one of the notches 71 or 72 are brought into registry with the bore of the cross journal 73, one or the other of the pins 76 or 77 will enter its respective aligned notch, thereby preventing further movement of the rod and likewise releasably locking the handle in its raised or lowered position. When the handle is in the neutral position as illustrated in Figures 1, 2 and 5 of the drawing, the springs 52 and 57 will be balanced, fluid may flow equally through the valve ports 32 and 33, and the rod 64 is positioned so that the pins 76 and 77 are urged towards the normal periphery of the rod permitting free movement of the latter. In such position a slight movement up and down of the handle will result in a slight opening or closing of the ports 32 and 33 permitting small adjustment if desired to move the link 16. However, assuming for a moment that the tool holder is in its raised position, that is, with the parts shown in Figure 1 of the drawing, and the operator desires to lower the holder, he will move the handle from the solid line position shown in Figure 6 to the lower position illustrated in dot-dash lines. This will result in the rod 64 moving to the left as viewed in Figure 6 until the notch 72 is in alignment with pin 77 at which time the latter will be forcibly urged into the notch and lock the rod and consequently the handle in such lower position. This interengagement of pin 77 with the notch 72 is illustrated in Figure 3 of the drawing. By the same token, again assuming the parts in their neutral position but with the tool holder lowered, when it is desired to raise the same, the handle is raised to its dotted line position against the compression of spring 57 which will result in a movement of the rod 64 to the right as viewed in said figure until pin 76 enters and engages the notch 71 of the rod, as best seen in Figure 4 of the drawing.

In order to normally force the pins 76 and 77 inwardly towards their respective notches, a spring 81 may be utilized. As will be seen, one end of the tension spring 81 is secured to an arm 82 extending radially from pin 76 and the other end of the spring is secured to a bracket 83 carried on a hollow tube 84 which is provided with a bracket 86 which is secured to the outer end of pin 77.

Means are provided for the release of the pins 76 and 77 when link 16 has reached its desired limits of travel, and as here illustrated, include a connecting rod 91 pivotally secured to link 16 as indicated at 92. The other end of connecting rod 91 is pivotally mounted as at 93 to a lug 94 carried on a transversely extending shaft 96 which may be journalled for axial sliding movement in a sleeve 97 secured to and depending from base member 37. Also secured to lug 94 and shaft 96 is an upstanding arm 98 which is provided with an enlarged aperture 99 through which pin 76 freely extends, and adjacent the top of arm 98 is secured a transversely extending rod 102 disposed in parallel relationship to the pins 76 and 77 and extending on both sides of the arm 98. The distal end of rod 102 extends through an aperture 103 provided in the pin arm 82 and a stop is provided such as by a cotter key 104 at the end of the rod. The other end of rod 102 slidably extends into the member 84, which, as previously explained, is connected by the spring 81 to the bracket 82. Rod 102 may enter the member 84 a predetermined distance as controlled by an adjustment member 106 which is threadedly engaged to the bracket 86 and enters the bore of member 84 from the opposite direction as rod 102.

With the foregoing description in mind, the operation of the apparatus will now be further and more fully discussed. Assume the control mechanism is in its normal position with the handle in the solid line position of Figure 6 and the tool holder raised as indicated in Figure 1 of the drawing, and the operator desires to have the tool holder lowered by rotating the link 16 in a clockwise direction as viewed in the drawing to the position illustrated in Figure 2. The operator pushes the handle 41 downwardly to the dot-dash position of Figure 6 which compresses spring 52 and moves the valve rod 36 outwardly from valve 31 and permits fluid to flow from the latter into the port 26. This, of course, results in a retraction of rod 22 and a resulting clockwise rotation of link 16. As the handle 41 is brought to its lowermost position, pin 77 under the influence of spring 81 is caused to enter the notch 72 in the control rod 64 thereby locking the handle in its down position. The handle will remain in such down position without further attention on the part of the operator. However, as the link 16 moves to a position wherein the tool holder has been lowered to a desired extent, the link will force the connecting rod 91 to move the bracket 94. Such actuation of rod 91 will move the arm 98 to the right as viewed in Figure 3 until the rod 102 engages the end of the control member 106. Continued movement will move the control member as well as the bracket 86 to which it is connected to the right and since such bracket is likewise connected to pin 77 the latter will likewise be moved to the right and out of engagement with the notch 72. This will result in a freeing of the rod 64 for axial movement and it is returned to its normal inoperative position due to the compression of the compressed spring 52. Thus, the handle will be returned to its neutral position and the valve rod 36 will be moved therewith so as to stop any further flow of fluid into conduit 26 and the link 16 and consequently the tool holder will be locked in position. If for any reason a further adjustment was required by the operator after the holder was lowered, the handle 41 could be moved upwardly or downwardly without effecting a full engagement of the pins 76 and 77 with their respective notches. However, normally the operator will set the control member 106 to a predetermined position in advance, and this will subsequently control all future actuation of the handle 41.

With the tool holder in the lowered position, and the valve control mechanism in the neutral position as illustrated in Figure 2 of the drawing, a reversal of operation takes place when the operator desires to raise the tool holder such as by moving link 16 in a counterclockwise direction. The foregoing takes effect when the operator raises handle 41 against the pressure of spring 57. Such raising of the handle will cause rod 64 to move axially through the journal member 66 until notch 71 is engaged by pin 76 which will keep the handle in its raised position and cause fluid to flow from the valve into cylinder port 27 resulting in an extension of rod 22 and counterclockwise rotation of link 16. In this case, as the link 16 arrives at its desired preselected position, the connecting rod 91 will move the bracket 94 to the left as viewed in the drawings. As the arm 98 moves to the left, it will engage the bracket 82, likewise moving the latter to the left, and since pin 76 is secured to the bracket 82 it will be forced out of engagement with the rod notch 71 permitting the action of spring 57 to return the handle and the associated valve control rod 36 to its neutral position.

It will thus be seen from the foregoing description of the constructional details and mode of operation of the instant apparatus, that an extremely efficient automatic operation is obtained with a minimum of working parts or complicated mechanisms. The operator, once the control member 106 is set may operate his tractor with little or no attention to the depth control since he is only required to either push the handle down or raise the handle up to effect a comparable lowering and raising of his tools.

What is claimed is:

1. Apparatus of the character described adapted for use with a valve having a pair of ports and an axially extending valve port control member, including a handle adapted to be operatively connected to said control member for moving the latter from and towards said valve to selectively open and close each of said ports, spring means normally urging said handle and said control member into a neutral position, spring means releasably locking said handle in a down position when the handle is moved to such position, spring means releasably locking said handle in a raised position when the handle is moved to such position, link means movable for disengaging each of said locking means whereby said handle and said control member may be returned to said neutral position, and said handle being manually movable towards each of said positions without effecting engagement of said locking means.

2. Apparatus of the character described adapted for use with a valve member having a pair of ports, a control rod adapted to be axially movable to selectively open and close said ports, a handle operatively connected to said control rod and movable therewith, a spring loaded detent operatively engaged with said handle upon movement of the latter in one direction, link means effecting disengagement of said detent, means returning said handle to a neutral position upon release of said detent, and means varying said link means for selectively controlling the return of said handle to said neutral position.

3. Apparatus as set forth in claim 2 in which said handle is provided with a generally rod-like member having a notch therein, a transversely extending pin normally engaging a wall of said rod, means urging said pin towards said rod whereby said pin will enter said notch upon axial movement of said rod, and an arm engageable with said pin for moving the latter out of said notch.

4. Apparatus of the character described adapted for use with a valve having a pair of fluid ports, comprising a control member axially movable adapted to selectively open and close said ports, a manually engageable handle operatively connected to said control member, means normally urging said handle and said control member into a neutral position, said handle being movable from said neutral position to a downward position wherein one of said ports is adapted to be opened and to an upper position wherein the other of said ports is opened, a longitudinally extending rod disposed in parallel spaced relationship to said control member, said rod having a notch in the side thereof, said rod being movable axially upon handle movement, a spring loaded pin engageable with a wall of said rod and registrable with the notch therein when said handle is in a down position, a bracket secured to said pin and movable with said pin to effect disengagement of said pin from said rod notch.

5. Apparatus as set forth in claim 4 including a threaded member operatively connected to said pin in parallel spaced relationship thereto, and a pin disposed in opposed relationship to said threaded member and engageable therewith upon movement of said pin in one direction to move said bracket and pin out of said engagement with the rod notch.

6. Apparatus as set forth in claim 5 in which said rod is provided with a second notch diametrically opposed and axially spaced from said first mentioned notch, and a second spring loaded pin engageable with said rod and registerable with said second notch when the handle is in an up position.

7. Apparatus of the character described adapted for use with a valve having a pair of fluid ports, comprising an axially extending rod movable from a neutral position and adapted to selectively open and close the respective ports, a manually engageable handle operatively connected to said rod for axially moving the latter, spring means operatively engaged with said handle and maintaining the same in a center position wherein said rod is in a neutral position, an axially extending shaft disposed in parallel spaced relation to said rod and axially movable upon handle movement said shaft having a pair of diametrically opposed and axially spaced notches thereon, a pair of aligned pins extending transversely of said shaft and normally engaging opposite side portions thereof intermediate said notches, means urging said pins towards said shaft whereby upon movement of the latter one of said pins may enter its adjacent notch for locking said shaft and handle, and link means operative to release said pins form said notches.

8. Apparatus is set forth in claim 7 including means interposed between said link means and are of said pins for selectively determining release of said one pin upon movement of said link means.

References Cited in the file of this patent
UNITED STATES PATENTS

| | | |
|---|---|---|
| 2,246,379 | Muir et al. | June 17, 1941 |
| 2,689,585 | Pesnell | Sept. 21, 1954 |
| 2,757,641 | Meddock | Aug. 7, 1956 |